United States Patent [19]
Wei et al.

[11] Patent Number: 6,103,812
[45] Date of Patent: *Aug. 15, 2000

[54] MICROWAVE CURABLE ADHESIVE

[75] Inventors: Jianghua Wei, Raleigh; Zakaryae Fathi, Cary, both of N.C.

[73] Assignee: Lambda Technologies, Inc., Morrisville, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/964,139

[22] Filed: Nov. 6, 1997

[51] Int. Cl.⁷ ..................................................... H05B 6/64
[52] U.S. Cl. ............................. 524/496; 522/4; 522/113; 427/508; 428/345
[58] Field of Search ................. 524/496; 522/4, 522/113; 427/508; 428/345

[56] References Cited

U.S. PATENT DOCUMENTS

| | | | |
|---|---|---|---|
| 3,461,014 | 8/1969 | James | 156/272 |
| 3,469,053 | 9/1969 | Levinson | 219/10.55 |
| 3,620,876 | 11/1971 | Guglielmo, Sr. et al. | 156/272 |
| 3,657,038 | 4/1972 | Lightfoot | 156/106 |
| 4,018,642 | 4/1977 | Pike et al. | 156/272 |
| 4,035,547 | 7/1977 | Heller, Jr. et al. | 428/329 |
| 4,067,765 | 1/1978 | Heller, Jr. et al. | 156/272 |
| 4,219,361 | 8/1980 | Sutton et al. | 106/63 |
| 4,283,427 | 8/1981 | Winters et al. | 426/107 |
| 4,490,183 | 12/1984 | Scovell | 148/1.5 |
| 4,529,856 | 7/1985 | Meek et al. | 219/10.55 M |
| 4,559,429 | 12/1985 | Holcombe | 219/10.55 F |
| 4,626,642 | 12/1986 | Wang et al. | 219/10.55 M |
| 4,655,276 | 4/1987 | Bird et al. | 164/519 |
| 4,906,497 | 3/1990 | Hellmann et al. | 428/49 |
| 4,962,000 | 10/1990 | Emslander et al. | 428/461 |
| 5,012,068 | 4/1991 | Anderson | 219/10.55 M |
| 5,021,293 | 6/1991 | Huang et al. | 428/328 |
| 5,059,279 | 10/1991 | Wilson | 156/651 |
| 5,072,087 | 12/1991 | Apte et al. | 219/10.55 M |
| 5,079,397 | 1/1992 | Keefer | 219/10.55 E |
| 5,120,176 | 6/1992 | Bhatia et al. | 412/8 |
| 5,124,519 | 6/1992 | Roy et al. | 219/10.55 E |
| 5,149,396 | 9/1992 | Wilson | 156/656 |
| 5,164,562 | 11/1992 | Huffman et al. | 219/10.55 E |
| 5,175,031 | 12/1992 | Ochocki | 428/34.2 |
| 5,177,332 | 1/1993 | Fong | 219/10.55 E |
| 5,248,864 | 9/1993 | Kodokian | 219/10.41 |
| 5,254,821 | 10/1993 | Walters | 219/10.55 E |
| 5,254,824 | 10/1993 | Chamberlain et al. | 219/10.57 |
| 5,294,763 | 3/1994 | Chamberlain et al. | 219/729 |
| 5,310,977 | 5/1994 | Stenkamp et al. | 219/730 |
| 5,338,611 | 8/1994 | Lause et al. | 428/412 |
| 5,340,649 | 8/1994 | Roeker et al. | 428/344 |
| 5,343,024 | 8/1994 | Prosise et al. | 219/730 |
| 5,389,767 | 2/1995 | Dobry | 219/730 |
| 5,391,595 | 2/1995 | Clark, Jr. et al. | 523/300 |
| 5,400,460 | 3/1995 | Roeker et al. | 15/230.12 |
| 5,403,998 | 4/1995 | Sheen et al. | 219/730 |
| 5,433,804 | 7/1995 | Nottingham et al. | 156/71 |
| 5,446,270 | 8/1995 | Chamberlain et al. | 219/730 |
| 5,650,477 | 7/1997 | Parodi et al. | 428/357 |
| 5,798,395 | 8/1998 | Lauf et al. | 522/1 |

FOREIGN PATENT DOCUMENTS

| | | |
|---|---|---|
| 316557 A2 | 10/1988 | European Pat. Off. . |
| 424132 A2 | 10/1990 | European Pat. Off. . |
| 2555188 | 11/1983 | France . |
| WO92/09503 | 6/1992 | WIPO . |
| WO93/10960 | 6/1993 | WIPO . |

OTHER PUBLICATIONS

Notification of Transmittal of the International Search Report or the Declaration PCT/US98/22329.

*Primary Examiner*—James J. Seidleck
*Assistant Examiner*—Olga Asinovsky
*Attorney, Agent, or Firm*—Myers Bigel Sibley & Sajovec, PA

[57] ABSTRACT

The present invention provides a microwave curable adhesive comprising a polymer composition (e.g., a thermoplastic or thermoset polymer) and first and second microwave susceptible components. The first and second microwave susceptible components have a respective preselected size, preselected shape or preselected conductivity or combination thereof. These properties are selected to provide a multi-modal distribution of first and second microwave susceptible components and to increase microwave adsorption within said polymer composition.

23 Claims, 2 Drawing Sheets

MICROWAVE CURABLE ADHESIVE

FIELD AND BACKGROUND OF THE INVENTION

The present invention relates to microwave curable adhesives, and compositions and methods for improving the curing thereof.

Conventionally, thermoplastic and thermoset adhesives are cured using radiant heat or chemical reactions through the use of a catalyst or initiator. In an effort to reduce the cure time often required by these techniques, it has been suggested to use ultrasonic or electromagnetic techniques. See, for example, U.S. Pat. Nos. 3,620,876 to Guglielmo, Sr. et al; 4,219,361 to Sutton et al.; and 5,248,864 to Kodokian. Ultrasonic bonding utilizes acoustical properties of the material to be bonded. Electromagnetic bonding is accomplished by one of three methods: (a) magnetic energy induction; (b) dielectric energy generation; or (c) microwave generation. There is a particular interest in the use of microwave generation in that it permits articles to be bonded by rapidly curing the adhesive.

Heat is generated in materials irradiated with microwaves in accordance with either orientation polarization or equivalent resistance heating. The operative mechanism is dependent upon the operating frequency. Orientation polarization is perhaps the most important mechanism of polarization in the microwave frequency range. Equivalent resistance heating results from the flow of conductive current in the substance. The current is related to electronic conduction and ionic conduction in a material. Equivalent resistance heating is more significant at lower frequencies.

Also known as dipolar polarization, orientation polarization involves the perturbation of the random motion of ionic or molecular dipoles to produce a net dipolar orientation under the direction of an applied electric field. Orientation polarization depends on the internal structure of the molecules and on the molecular arrangement or the structure of the dielectric substance, i.e., the adhesive or substrate. Thus, each material exhibits a specific dielectric behavior (losses) which is dependent upon the range of temperatures and frequencies used during processing. Dielectric loss measurements of a given material over the range of temperatures and frequencies of interest provide the information necessary to select frequencies and to select those frequencies which optimize heating of that material. For most polymeric materials, the orientation polarization loss peak (maximum loss) shifts to higher frequencies as the temperature of the material is increased.

Many adhesives, however, are not susceptible to microwave curing, or if the adhesives are, curing is slow or difficult to control or both. Thus it has been proposed in, for example, U.S. Pat. No. 4,626,642 to Wang et al., to blend electrically conductive fibers into a thermoset adhesive to accelerate cure rates. U.S. Pat. No. 4,906,497 to Hellmann et al. proposes the use of electrically conductive materials (e.g., carbon fibers) to accelerate the heating-up rate by microwaves.

In addition, microwaves, particularly single frequency microwaves, are not always uniformly distributed throughout the microwave oven. Differential heating can result in heating only specific portions of the adhesive resulting in uneven curing. An alternative to single frequency microwaves and this problem of differential heating is to use variable frequency microwaves as is suggested in U.S. Pat. No. 5,321,222 to Bible et al. The use of variable frequency microwaves, however, does not typically overcome susceptibility problems.

Thus there remains a need to provide adhesives which are susceptible to curing using various microwave techniques particularly using variable frequency microwaves.

SUMMARY OF THE INVENTION

To this end, the present invention provides a microwave curable adhesive comprising a polymer composition (e.g., a thermoplastic or thermoset polymer) and first and second microwave susceptible components. The first and second microwave susceptible components have a respective preselected size, preselected shape or preselected conductivity or combination thereof. These properties are selected to provide a multi-modal distribution of first and second microwave susceptible components and to increase microwave adsorption within said polymer compositions particularly when cured using variable frequency microwaves.

In an alternative embodiment, the microwave curable adhesive comprises a polymer composition and a network of interconnected first and second conductive fibers dispersed within said polymer composition such that said adhesive has a volumetric fraction of first and second conductive fibers of between 0.01% and 2% and a weight fraction of first and second conductive fibers of between 1% and 20%.

DETAILED DESCRIPTION OF THE INVENTION

Figure 1:
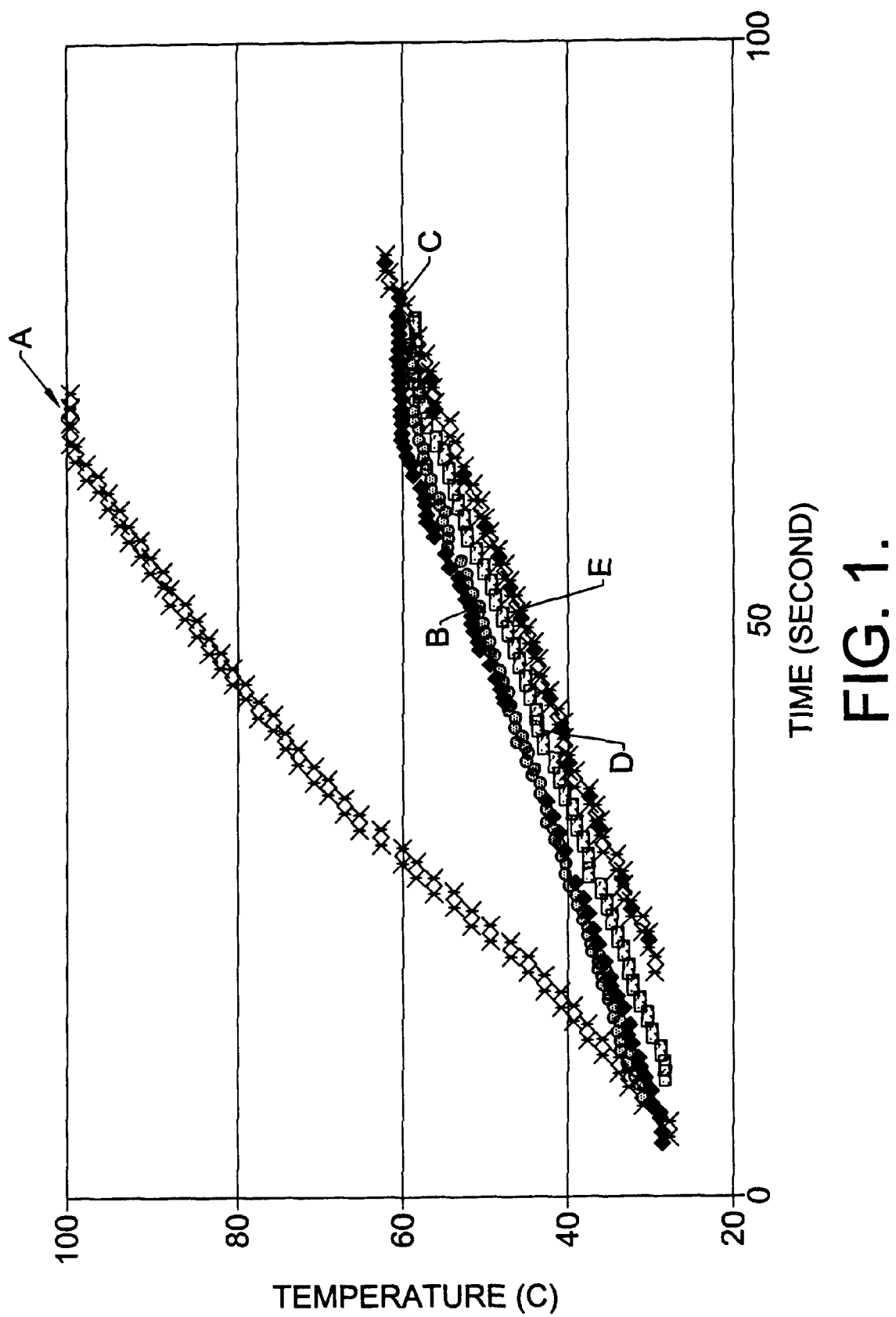
FIG. 1 shows a heating curve according to Example 1.

As discussed above, the present invention provides a microwave curable adhesive comprising a polymer composition and microwave susceptible components. The adhesive is susceptible to uniform curing particularly using variable frequency microwaves. Moreover by using variable frequency microwaves and the microwave susceptible components of the present invention, arcing of the microwaves is avoided. The polymer composition is either a thermoplastic or thermoset polymer. Suitable thermoplastic polymers include polyolefins, vinyl polymers, polycarbonates, polyamides, polystyrenes, polyetherimides, polyarylene sulfones, polyphenylene sulfides, polyphenylene oxides, polyethersulfones, polyetherether ketones and blends and copolymers thereof. Suitable thermoset polymers include epoxies, phenol formaldehydes, urea-formaldehydes, melamine formaldehydes, polyesters, polyurethanes, cyanate esters, polybutadienes, alkyals, polyimides, amino resins and silicones and blends and copolymers thereof. Specific preferred polymers include: duPont ELVAX, an ethylene/vinyl acetate/acid terpolymer; Henkel Q5355s, a carbon-doped polypropylene; HB Fuller HL 6444; Bemis C525 1, a carbon-filled polyester; Bemis 5251, an unfilled polyester; and Bemis 6218, a polyolefin. These adhesives may contain any of the commonly-employed additives, such as but not limited to, fillers, colorants, curing agents, pigments, and thickening agents. In an alternative embodiment, the adhesive may be one used to bond materials having deformation temperatures lower than the activation temperature of the adhesive, such as described in U.S. Patent Application entitled "Methods and Apparatus for Bonding Deformable Materials Having Low Deformation Temperatures" filed Nov. 6, 1997, the disclosure of which is incorporated herein by reference in its entirety. Such an adhesive is useful in forming laminates suitable for many purposes such as bonding the soles of footwear, providing durable padding comprising a shock-absorbing padding material layer bonded to at least one wear resistant layer, and the like.

In combination with the thermoplastic or thermoset polymer is a first microwave susceptible component and a second microwave susceptible component. Various properties of these first and second microwave susceptible components are preselected to provide a multi-modal distribution to increase microwave absorption of the variable frequency microwaves particularly within the thermoplastic or thermoset polymer. The multi-modal distribution also allows the heating rate to be increased. Moreover, the overall heating efficiency of the adhesive can be increased without increasing the weight percent loading of adhesive. This results in the viscosity of the adhesive being substantially low so that the adhesive can be easily sprayed onto a substrate. Most of the prior art methods and adhesives have levels of a single microwave susceptible component that prevent the adhesive from being sprayed. Moreover, such microwave susceptible components can cause arcing when conventional single frequency microwaves are used.

In operation, when the microwave susceptible components, e.g., fibers of different length, diameter and/or conductivity are exposed to microwaves, an electric current is generated within the fibers which generates heat inside the fibers. The heat generation is directly proportional to the square of the current generated within the fiber and the electrical resistance of the fiber. The lower the resistivity, the higher the current density. When the applied electric field is sufficiently high, the charge buildup between different fibers will be so high that it surpasses the existing dielectric resistance imposed by the nonconducting material. The smaller the gap between fibers, the lesser the charge buildup is necessary to cause heat. In order to take the advantage of this heating mechanism, a formation of an interconnecting "semi-conductive path" is required. The "semi-conductive" phenomenon refers to a condition that the microwave susceptible component itself is not conductive but the gaps between the individual microwave susceptible components are sufficiently small for electric breakdown to occur when the applied field is sufficiently high. In other words, the filling factor of the fiber is very important for heat enhancement. The higher the filling factor, the easier for fibers to form an interconnecting network. The amount of microwave susceptible components required to form this network depends on fiber size, distribution, and conductivity. The higher the conductivity, the lesser amount of the components is required to observe this heating mechanism because the charge buildup is more significant. Also, it is desirable to have fibers of different sizes to enhance the heating rate and heating uniformity.

As stated above, the properties of the first and second microwave susceptible components that are preselected are preferably shape, size, or conductivity or combination thereof. For example, the first microwave susceptible component preferably is a fiber having a diameter of about 0.01 to 0.1 $\mu$m, a length of about 10 to 300 $\mu$m and a conductivity of about $10^{-2}$ to $10^{-7}$ $\Omega$/cm. The second microwave susceptible component can be a particle or a fiber. If the second microwave susceptible component is a particle, preferably it has a particle size of about 1 to 40 $\mu$m and a conductivity of about $10^{-2}$ to $10^{-7}$ $\Omega$/cm.

If the second microwave susceptible component is a fiber then it is preferred that the components be a network of interconnected fibers for the reasons stated above. Moreover, the fibers should be of substantially different sizes. For example, the first microwave susceptible component can have a diameter of about 0.07 to 0.1 $\mu$m, a length of about 10 to 300 $\mu$m and conductivity of about $10^{-2}$ to $10^{-7}$, the second microwave susceptiable component can have a diameter of about 1 to 20 $\mu$m, a length of 50 to 600 $\mu$m and a conductivity of about $10^{-2}$ to $10^{-7}$ $\Omega$/cm. In order to maintain the adhesive at a viscosity sufficient to be sprayed, the volumetric fraction of first and second conductive fibers of between 0.01% and 2% and a weight fraction of first and second conductive fibers of between 1% and 20% is desirable. magnetic metals (e.g., iron, nickel, magnetic stainless steel, alloys thereof, etc.), nonmagnetic metals (e.g., aluminum, titanium, silver, gold, magnesium, nonmagnetic stainless steel, copper, chromium and alloys thereof, etc.), and silicon carbide.

Chemical dopants can also be incorporated into the molecular structure of the adhesive and can be either a strong dipole or electron acceptor, such as I, $AsF_6$, or $ClO_4$, or an electron donor, such as Li, Na, or K.

In operation, a substrate or workpiece is bonded to a similar or dissimilar material, e.g., wood to wood, wood to plastic, plastic to plastic, semi-conductor material to semi-conductor material, semi-conductor material to plastic, etc. by applying the adhesive of the present invention using commonly used and known techniques (e.g., spraying) to the substrate or other material or both; subjecting the adhesive to single frequency microwaves or preferably variable frequency microwaves using apparatus such as described in U.S. Pat. No. 5,321,222 to Bible et al., the disclosure of which is incorporated herein by reference in its entirety; and thereby curing the adhesive to form the bond.

By selecting frequencies and powers that cure or soften a particular adhesive essentially without causing excessive heating of the substrates, deformation and other heat-related damage is avoided. The practical range of frequencies within the electromagnetic spectrum from which microwave frequencies may be chosen is about 0.90 GHz to 40 GHz. Every substrate or workpiece irradiated with microwave energy typically has at least one bandwidth, or window of frequencies within this overall range, that will cure or soften the adhesive without damaging the substrates. The term "window" as used herein, refers to a range of microwave frequencies bounded on one end by a specific frequency and bounded on the opposite end by a different specific frequency. Outside a particular window of damage-free frequencies, substrates may become deformed or otherwise damaged. A window may vary, depending on the component configuration, geometry, and composition of both substrates and adhesives. A workpiece may have a plurality of such windows. With the information set forth herein, a skilled practitioner will be able to select damage-free windows for a particular workpiece, whether empirically, through trial and error, or theoretically, using power reflection curves and the like.

Within a window of damage-free frequencies for a particular workpiece, it generally is preferred to select those frequencies that result in the shortest processing time. Typically, the time required to form the bond is set by the time required to cure a thermoset adhesive or to soften a thermoplastic adhesive. Preferably, a workpiece is processed with a subset of frequencies from the upper end of each window. More modes can be excited with higher frequencies than with lower frequencies. Therefore, better uniformity in processing typically is achieved. Additionally, at the higher frequency, more microwave energy is imparted to the workpiece, and energy absorption depth is more shallow. Greater microwave energy absorption and lesser microwave penetration depth result in shorter processing time. However, any subset of frequencies within a window of damage-free frequencies may be used.

Many workpieces irradiated with microwave energy have multiple windows of frequencies within which a thermoset adhesive will cure or a thermoplastic resin will soften without causing damage to the substrates. For example, a particular workpiece may be irradiated with microwave energy without damage at frequencies between 3.50 GHz and 6.0 GHz, and also may be irradiated without damage between 7.0 GHz and 10.0 GHz. The availability of additional windows provides additional flexibility for achieving rapid, yet damage-free bonding. Complex geometrical configurations and material combinations may shrink or close a window of processing frequencies otherwise available. The availability of alternative windows permits bonding of a workpiece using microwave irradiation without having to resort to other curing methods.

Preferably, the step of curing is performed by "sweeping" the workpiece with variable frequencies from within a particular window of damage-free frequencies. The term "sweeping" as used herein, refers to irradiating the substrate or workpiece, i.e., the adhesive(s) and the substrates, with many of the frequencies within a particular window. Frequency sweeping results in uniformity of heating because many more complementary cavity modes can be excited. The uniformity in processing afforded by frequency sweeping provides flexibility in how groups of components to be bonded are oriented within the microwave furnace. Therefore, it is not necessary to maintain each workpiece in precisely the same orientation.

Sweeping may be accomplished by launching the different frequencies, either simultaneously or sequentially, within a window. For example, for a window of damage-free frequencies of from 2.60 GHz to 7.0 GHz, frequency sweeping involves continuously and/or selectively launching frequencies within this range in any desirable increments. Thus, moving from 2.6 to 3.3 GHz in increments of 0.0001 GHz would be acceptable. Indeed, virtually any incremental launching pattern may be used.

The rate at which the selected frequencies are launched is referred to as the sweeping rate. This rate may be any time value, including, but not limited to, milliseconds, seconds, and minutes. Preferably, the sweep rate is as rapid as practical for the particular substrate or workpiece being processed.

The following examples are provided for illustration purposes, and are not intended to be limiting as to the scope of the present invention.

EXAMPLES

Example 1

In order to demonstrate the correlation of fiber size, conductivity and distribution, five types of fiber were selected. The fibers are as follows:

| Fiber Type | Electric Resistivity (Ω/cm) | Diameter (μm) | Length (μ)m |
|---|---|---|---|
| PYROGRAF III Carbon fiber available from Applied Science, Inc. | 0.0015 | .02 | 40–200 |
| CARBOFLEX Pitch-Based Carbon fibers available from Textron Systems | 0.0060 | 12 | 200 |
| PANEX 33MF available from Zoltek Corporation | 0.0014 | 7.4 | 150 |
| THORNEL ® available from Amoco | 0.0003 | 10 | 200 |

-continued

| Fiber Type | Electric Resistivity (Ω/cm) | Diameter (μm) | Length (μ)m |
|---|---|---|---|
| Chaff available from Tracor | 10 | 18 | 200–350 |

A pigment, $TiO_2$ was included. The particle size diameter was <5 μm and had a density of 4.17. The rate of heating of and microwave frequency(s) of a HB Fuller HL 6444 adhesive was then measured for the following combinations and the heating curve is shown in FIG. 1.

| Graph Line | Combination |
|---|---|
| A | 0.1% PYROGRAF III, 3% PANEX 33MF, 8.5% $TiO_2$ |
| B | 0.1% PYROGRAF III, 4% CARBOFLEX, 8.5% $TiO_2$ |
| C | 0.1% PYROGRAF III, 7% Chaff, 7.5% $TiO_2$ |
| D | 0.1% PYROGRAF III, 6% Chaff, 8.5% $TiO_2$ |
| E | 0.1% PYROGRAF III, 5% Chaff, 8.5% $TiO_2$ |

As the graph illustrates, small amounts of a second microwave susceptible component can be added so long as a good mix of conductivity is preselected.

Example 2

In order to demonstrate that advantages to the use of first and second microwave susceptible components, the following rates of heating of HB Fuller HL 6444 was measured and the heating curve shown in FIG. 1.

| Graph Line | Combination |
|---|---|
| F | 5% Panex 33MF, 0.15% Pyrograf III |
| G | 5% Panex 33MF |
| H | 4% Panex 33MF, 0.15% Pyrograf III |
| I | 4% Panex 33MF |

As the graph illustrates, there is a significant increase in rate of heating when both first and second microwave susceptible components are used as compared to a single microwave susceptible component.

The present invention has been described in detail above. This invention may, however, be embodied in many different forms and should not be construed as limited to the embodiments set forth herein above; rather, these embodiments are provided so that this disclosure will be thorough and complete, and will fully convey the scope of the invention to those skilled in the art.

That which is claimed:

1. A microwave curable adhesive comprising a polymer composition and a mixture of first and second microwave susceptible components, said first microwave susceptible component having a first preselected property selected from the group consisting of size, shape or conductivity or combination thereof, and said second microwave susceptible component having a second preselected property selected from the group consisting of size, shape or conductivity or combination thereof, said preselected first and second properties providing a multi-modal distribution of the first and second microwave susceptible components to increase microwave absorption within said polymer composition.

2. The microwave curable adhesive according to claim 1 wherein the polymer composition is a thermoset polymer.

3. The microwave curable adhesive according to claim 2 wherein the thermoset polymer is selected from the group consisting of epoxies, phenol formaldehydes, urea-formaldehydes, melamine formaldehydes, polyesters, polyurethanes, cyanate esters, polybutadienes, alkyals, polyimides, amino resins and silicons and blends and copolymers thereof.

4. The microwave curable adhesive according to claim 1 wherein the polymer composition is a thermoplastic polymer.

5. The microwave curable adhesive according to claim 4 wherein the thermoplastic polymer is selected from the group consisting of polyolefins, vinyl polymers, polycarbonates, polyamides, polystyrenes, polyetherimides, polyarylene sulfones, polyphenylene sulfides, polyphenylene oxides, polyethersulfones, polyetherether ketones and blends and copolymers thereof.

6. The microwave curable adhesive according to claim 1 wherein the first microwave susceptible component is a fiber having a diameter of about 0.01 to 0.1 $\mu$m and a length of about 10 to 300 $\mu$m and a conductivity of about $10^{-2}$ to $10^{-7}$ $\Omega$/cm, and a second microwave susceptible component is a particle having a diameter of about 1 to 40 $\mu$m and a conductivity of about $10^{-2}$ to $10^{-7}$ $\Omega$/cm.

7. The microwave curable adhesive according to claim 1 wherein said first microwave susceptible component has a first size, and wherein said second microwave susceptible component has a second size substantially larger than said first size.

8. A microwave curable adhesive comprising a polymer composition and a network of interconnected first and second conductive fibers dispersed within said polymer composition such that said adhesive has a volumetric fraction of first and second conductive fibers of between 0.01% and 2% and a weight fraction of first and second conductive fibers of between 1% and 20%.

9. The microwave curable adhesive according to claim 8 wherein said first conductive fibers have a first size, and wherein said second conductive fibers have a second size substantially larger than said first size.

10. The microwave curable adhesive according to claim 9 having a viscosity of less than 500 centipoise at a temperature of between room temperature and 250° C.

11. The microwave curable adhesive according to claim 8 wherein the polymer composition is a thermoset polymer.

12. The microwave curable adhesive according to claim 11 wherein the thermoset polymer is selected from the group consisting of epoxies, phenol formaldehydes, urea-formaldehydes, melamine formaldehydes, polyesters, polyurethanes, cyanate esters, polybutadienes, alkyals, polyimides, amino resins and silicones and blends of copolymers thereof.

13. The microwave curable adhesive according to claim 8 wherein the polymer composition is a thermoplastic polymer.

14. The microwave curable adhesive according to claim 13 wherein the thermoplastic polymer is selected from the group consisting of polyolefins, vinyl polymers, polycarbonates, polyamides, polystyrenes, polyetherimides, polyarylene sulfones, polyphenylene sulfides, polyphenylene oxides, polyethersulfones, polyetherether ketones and blends and copolymers thereof.

15. The microwave curable adhesive according to claim 9 wherein said first conductive fibers have a diameter of about 0.01 to 1 $\mu$m, a length of about 10 to 300 $\mu$m and a conductivity of about $10^{-2}$ to $10^{-7}$ $\Omega$/cm, and wherein said second conductive fibers have a diameter of about 1 to 20 $\mu$m, a length of about 50 to 600 $\mu$m and a conductivity of about $10^{-2}$ to $10^{-7}$ $\Omega$/cm.

16. A method of bonding a substrate to similar or dissimilar material comprising the steps of:

applying a microwave curable adhesive comprising a polymer composition and a mixture of first and second microwave susceptible components, said first microwave susceptible component having a first preselected property selected from the group consisting of size, shape or conductivity or a combination thereof, and said second microwave susceptible component having a second preselected property selected from the group consisting of size, shape or conductivity or combination thereof, said preselected first and second properties providing a multi-modal distribution of the first and second microwave susceptible components to increase microwave absorption within said polymer composition, and subjecting the microwave curable adhesive to variable frequency microwaves to cure the microwave curable adhesive.

17. The method according to claim 16 wherein the polymer composition is a thermoset polymer.

18. The method according to claim 17 wherein the thermoset polymer is selected from the group consisting of epoxies, phenol formaldehydes, urea-formaldehydes, melamine formaldehydes, polyesters, polyurethanes, cyanate esters, polybutadienes, alkyals, polyimides, amino resins and silicons and blends and copolymers thereof.

19. The method according to claim 16 wherein the polymer composition is a thermoplastic polymer.

20. The method according to claim 19 wherein the thermoplastic polymer is selected from the group consisting of polyolefins, vinyl polymers, polycarbonates, polyamides, polystyrenes, polyetherimides, polyarylene sulfones, polyphenylene sulfides, polyphenylene oxides, polyethersulfones, polyetherether ketones and blends and copolymers thereof.

21. The method according to claim 16 wherein the first microwave susceptible component is a fiber having a diameter of about 0.01 to 0.1 $\mu$m and a length of about 10 to 300 $\mu$m and a conductivity of about $10^{-2}$ to $10^{-7}$ $\Omega$/cm, and second microwave susceptible component is a particle having a diameter of about 1 to 40 $\mu$m and conductivity of about $10^{-2}$ to $10^{-7}$ $\Omega$/cm.

22. The method according to claim 16 wherein said first microwave susceptible component has a first size, and wherein said second microwave susceptible component has a second size substantially larger than said first size.

23. The method according to claim 16 wherein the first and second microwave susceptible components are conductive fibers, and are a network if interconnected first and second conductive fibers dispersed within said polymer composition such that said adhesive has a volumetric fraction of first and second conductive fibers of between 0.01% and 2% and a weight fraction of first and second conductive fibers of between 1% and 20%.

* * * * *

UNITED STATES PATENT AND TRADEMARK OFFICE
CERTIFICATE OF CORRECTION

PATENT NO.    : 6,103,812
DATED         : August 15, 2000
INVENTOR(S)   : Wei et al.

It is certified that error appears in the above-identified patent and that said Letters Patent is hereby corrected as shown below:

Title page,
Item [56], -- U.S. Patent No. 5,182,134, 1/26/93 Sato -- should be listed.
Item [57], ABSTRACT,
Lines 7-10, should read -- These properties are selected to provide a multi-modal distribution of first and second microwave susceptible components and to increase microwave absorption within said polymer composition. --

Column 2,
Line 15, should read -- absorption within said polymer compositions particularly --.

Figure 2:
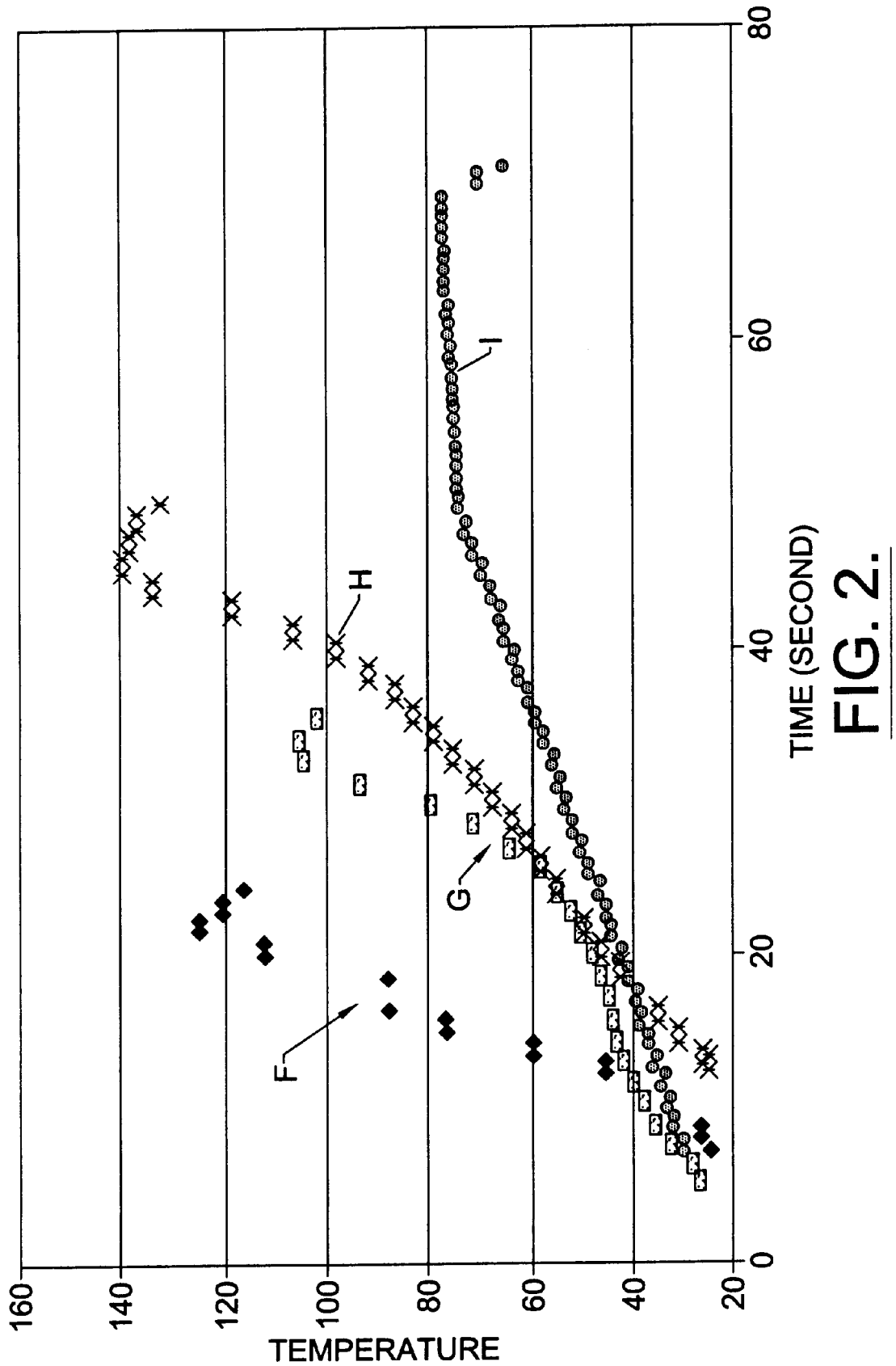
FIG. 2 shows a heating curve according to Example 2.

Column 6,
Line 34, "FIG. 1" should read -- FIG. 2 --.

Column 8,
Line 57, should read -- tive fibers, and area a network of interconnected first and --.

Signed and Sealed this

Twenty-ninth Day of October, 2002

Attest:

JAMES E. ROGAN
Attesting Officer       Director of the United States Patent and Trademark Office